US010555210B2

(12) United States Patent
Sun et al.

(10) Patent No.: US 10,555,210 B2
(45) Date of Patent: Feb. 4, 2020

(54) GROUP INDICATOR FOR CODE BLOCK GROUP BASED RETRANSMISSION IN WIRELESS COMMUNICATION

(71) Applicant: QUALCOMM Incorporated, San Diego, CA (US)

(72) Inventors: Jing Sun, San Diego, CA (US); Jing Jiang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/920,287

(22) Filed: Mar. 13, 2018

(65) Prior Publication Data
US 2018/0270705 A1 Sep. 20, 2018

Related U.S. Application Data

(60) Provisional application No. 62/471,863, filed on Mar. 15, 2017.

(51) Int. Cl.
*H04W 28/04* (2009.01)
*H04L 1/16* (2006.01)
*H04L 1/18* (2006.01)
*H04W 28/06* (2009.01)
*H04W 72/04* (2009.01)
*H04L 5/00* (2006.01)
*H04W 88/02* (2009.01)

(52) U.S. Cl.
CPC ........... *H04W 28/04* (2013.01); *H04L 1/1607* (2013.01); *H04L 1/1812* (2013.01); *H04W 28/06* (2013.01); *H04L 5/0055* (2013.01); *H04W 72/0413* (2013.01); *H04W 88/02* (2013.01)

(58) Field of Classification Search
CPC . H04W 28/04; H04W 28/06; H04W 72/0413; H04W 88/02; H04L 1/1657; H04L 1/1812; H04L 1/1607; H04L 5/0055; H04L 1/1887; H04L 2001/0093
See application file for complete search history.

(56) References Cited

U.S. PATENT DOCUMENTS

| | | | | |
|---|---|---|---|---|
| 2018/0123767 A1* | 5/2018 | Islam | ................... | H04L 1/1816 |
| 2018/0145797 A1* | 5/2018 | Yeo | ..................... | H04L 1/1812 |
| 2018/0167931 A1* | 6/2018 | Papasakellariou | .... | H04L 1/1671 |
| 2018/0270022 A1* | 9/2018 | Sun | ....................... | H04L 1/1893 |
| 2019/0181986 A1* | 6/2019 | Kitamura | .............. | H04L 1/1614 |

(Continued)

OTHER PUBLICATIONS

Samsung, "CB-group based retransmission for eMBB", 3GPP TSG RAN WG1 Meeting #88, R1-1702990, Feb. 13-17, 2017 (Year: 2017).*

(Continued)

*Primary Examiner* — Brian T O Connor
(74) *Attorney, Agent, or Firm* — Loza & Loza, LLP

(57) ABSTRACT

Aspects of the present disclosure provide a code block group (CBG) based HARQ retransmission process in which HARQ retransmission is performed based on CBG units. The CBG based HARQ process uses a CBG failure mask that can reduce the signaling overhead of CBG-based HARQ retransmissions. A base station can determine the error CBGs from different UEs that share a slot, and generate a CBG failure mask that capture all the CBGs NACKs from the UEs.

32 Claims, 14 Drawing Sheets

(56) References Cited

U.S. PATENT DOCUMENTS

2019/0261335 A1* 8/2019 Peng .................. H04L 5/0053

OTHER PUBLICATIONS

CATT: "EPHICH on NCT," 3GPP Draft, R1-133008, 3rd Generation Partnership Project (3GPP), Mobile Competence Centre, 650, Route Des Lucioles, F-06921 Sophia-Antipolis Cedex, France, vol. RAN WG1, No. Barcelona, Spain, Aug. 19, 2013-Aug. 23, 2013, Aug. 10, 2013 (Aug. 10, 2013), XP050716237, 2 Pages, Retrieved from the Internet: URL:http://www.3gpp.org/ftp/tsg_ranWG1_RL1/TSGR1_74/Docs/ [retrieved on Aug. 10, 2013].
Interdigital Communications: "Multi-Bits HARQ Feedback," 3GPP Draft, R1-1702379, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017 (Feb. 12, 2017), XP051209533, pp. 1-3, Retrieved from the Internet: URL:http://www.3gpp.org/ftp/Meetings_3GPP_SYNC/RAN1/Docs/ (retrieved on Feb. 12, 2017).
International Search Report and Written Opinion—PCT/US2018/022461—ISA/EPO—dated Jul. 3, 2018.
Mediatek Inc: "On Multiple HARQ Bits per TB and Feedback Mechanism", 3GPP Draft; R1-1702738 on Multiple HARQ Bits per TB and Feedback Mechanism_Final, 3rd Generation Partnership Project (3gpp), Mobile Competence Centre; 650, Route Des Lucioles; F-06921 Sophia-Antipol, vol. RAN WG1, No. Athens, Greece; Feb. 13, 2017-Feb. 17, 2017, Feb. 12, 2017 (Feb. 12, 2017), 4 Pages, XP051209885, Retrieved from the Internet: URL: http://www.3gpp.org/ftp/Meetings_3GPP_SYNC/RAN1/Docs/ [retrieved on Feb. 12, 2017].

* cited by examiner

US 10,555,210 B2

GROUP INDICATOR FOR CODE BLOCK GROUP BASED RETRANSMISSION IN WIRELESS COMMUNICATION

PRIORITY CLAIM

This application claims priority to and the benefit of U.S. provisional patent application No. 62/471,863 filed in the United States Patent and Trademark Office on Mar. 15, 2017, the entire content of which is incorporated herein by reference as if fully set forth below in its entirety and for all applicable purposes.

TECHNICAL FIELD

The technology discussed below relates generally to wireless communication systems, and more particularly, to code block group (CBG) based hybrid automatic repeat request (HARQ) signaling in wireless communication.

INTRODUCTION

In some wireless communication networks, a physical layer receives payload data from an upper layer (e.g., MAC layer) as one or more transport blocks that correspond to a MAC protocol data unit. The size of a transport block (TB) may be chosen based on various parameters. Different TB sizes may be used for different scenarios. For example, some of the parameters are an amount of data available for transmission, modulation and coding scheme (MCS), and resources (e.g., time and frequency resources) available for transmitting the data. One TB may be transmitted as multiple time domain symbols in a slot. When one or more symbols is not successfully transmitted to a receiving device, the corresponding TB may be retransmitted using a hybrid automatic repeat request (HARQ) process or the like.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a code block group (CBG) based hybrid automatic repeat request (HARQ) retransmission process in which HARQ retransmission is performed based on CBG units. The CBG based HARQ process uses a CBG failure mask that can reduce the signaling overhead of CBG-based HARQ retransmissions. A base station can determine the error CBGs from different UEs that share a slot, and generate a CBG failure mask that capture all the CBGs NACKs from the UEs.

One aspect of the present disclosure provides a method of wireless communication operable at a scheduling entity. The scheduling entity receives a first uplink (UL) transmission that includes a plurality of first code block groups (CBGs) from a first user equipment (UE) and a second UL transmission that includes a plurality of second CBGs from a second UE. The scheduling entity determines decoding error in one or more CBGs among the first and second CBGs. The scheduling entity generates a CBG failure mask indicating the decoding error, and the CBG failure mask is configured to indicate one or more time-frequency domain regions covering the one or more CBGs with the decoding error. The scheduling entity transmits the CBG failure mask to the first UE and the second UE to facilitate retransmission of the CBGs indicated by the CBG failure mask. For example, the UE may retransmit the CBG(s) using a HARQ process.

Another aspect of the present disclosure provides a method of wireless communication operable at a first user equipment (UE). The UE transmits an uplink (UL) transmission to a scheduling entity, and the UL transmission carries a plurality of code block groups (CBGs). The UE receives a CBG failure mask from the scheduling entity, and the CBG failure mask covers a time-frequency domain region designated for CBG retransmission. The UE compares time-frequency resources of the transmitted CBGs with time-frequency resources in the time-frequency domain region of the CBG failure mask, to determine one or more of the CBGs for retransmission. Then, the UE transmits the one or more CBGs for retransmission.

Another aspect of the present disclosure provides a scheduling entity. The scheduling entity includes a communication interface configured to communicate with a first user equipment (UE) and a second UE, a memory, and a processor operatively coupled to the communication interface and the memory. The processor and the memory are configured to receive a first uplink (UL) transmission from the first UE and a second UL transmission from the second UE. The first UL transmission includes a plurality of first code block groups (CBGs). The second UL transmission includes a plurality of second CBGs. The processor and the memory are configured to determine decoding error in one or more CBGs among the first and second CBGs. The processor and the memory are configured to generate a CBG failure mask indicating the decoding error. The CBG failure mask is configured to indicate one or more time-frequency domain regions covering the one or more CBGs with the decoding error. The processor and the memory are configured to transmit the CBG failure mask to the first UE and the second UE to facilitate retransmission of the CBGs indicated by the CBG failure mask.

Another aspect of the present disclosure provides a first user equipment (UE). The first UE includes a communication interface configured to communicate with a scheduling entity, a memory, and a processor operatively coupled to the communication interface and the memory. The processor and the memory are configured to transmit an uplink (UL) transmission to the scheduling entity, and the UL transmission carries a plurality of code block groups (CBGs). The processor and the memory are configured to receive a CBG failure mask from the scheduling entity, and the CBG failure mask includes a time-frequency domain region designated for CBG retransmission. The processor and the memory are configured to compare time-frequency resources of the transmitted CBGs with time-frequency resources in the time-frequency domain region of the CBG failure mask, to determine one or more of the CBGs for retransmission. The processor and the memory are configured to transmit the one or more CBGs for retransmission.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
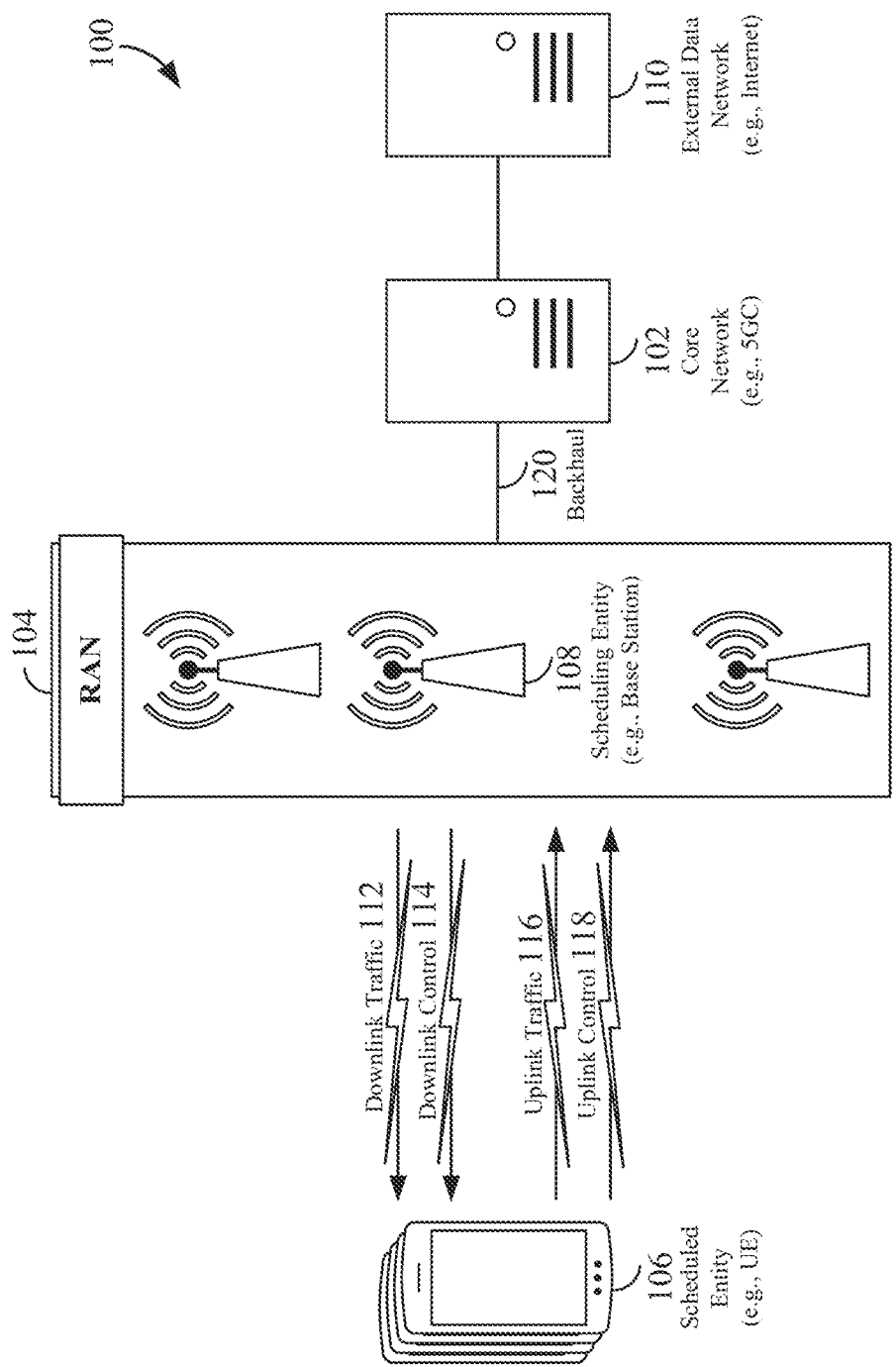
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many different platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily include a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In a 5G NR network, interference may be more bursty. A transmitting device may transmit a transport block (TB) that includes multiple code blocks (CBs) grouped into different code block groups. Bursty interference may affect only some of the CBs. In some examples, bursty interference may be caused by higher priority traffic such as ultra-reliable and low-latency communication (URLLC) or the like. To increase efficiency, retransmission of a TB may be performed in code block group (CBG) unit. For a certain TB, CBGs that are successfully transmitted need not be retransmitted when retransmission is performed in CBG unit. In various examples, a CBG may include any number of CBs. In one example, a CBG may include one code block (CB). In another example, a CBG may include any number of CBs or all CBs of a TB. By retransmitting only CBG(s) that is/are affected by bursty interference, retransmission efficiency may be improved and/or overhead may be reduced. Performing retransmission in CBG unit can provide a balance between retransmission feedback overhead and retransmission efficiency.

Aspects of the present disclosure provide various CBG based retransmission signaling schemes that can improve CBG-based data retransmission efficiency. In some examples, when an interference pattern (e.g., bursty interference) is similar across a relatively large portion of communication bandwidth, a common or group indicator may be used to signal CBG based uplink retransmission such that downlink signaling overhead may be reduced. The common or group indicator is configured to provide CBG retransmission information for multiple user equipments in order to reduce control signaling overhead.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
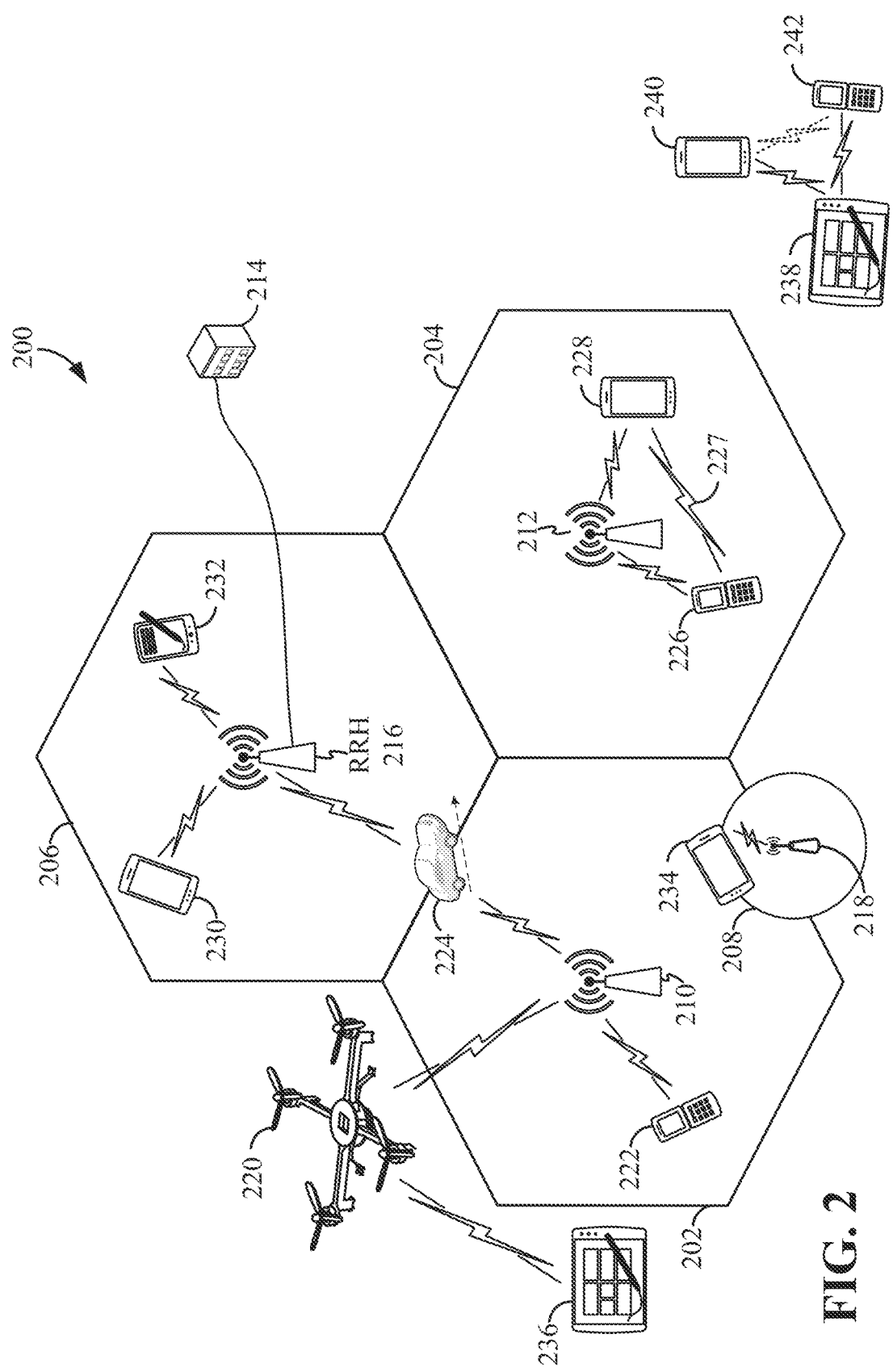
FIG. 2 is a conceptual illustration of an example of a radio access network.

FIG. 2 is a conceptual illustration of an example of a radio access network (RAN) 200. The RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. For example, a transmitting device may transmit a transport block (TB) that includes multiple CBs grouped into different code block groups. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a predetermined duration (e.g., 10 ms) for wireless transmissions, with each frame consisting of a predetermined number of frames (e.g., 10 subframes of 1 ms each). On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
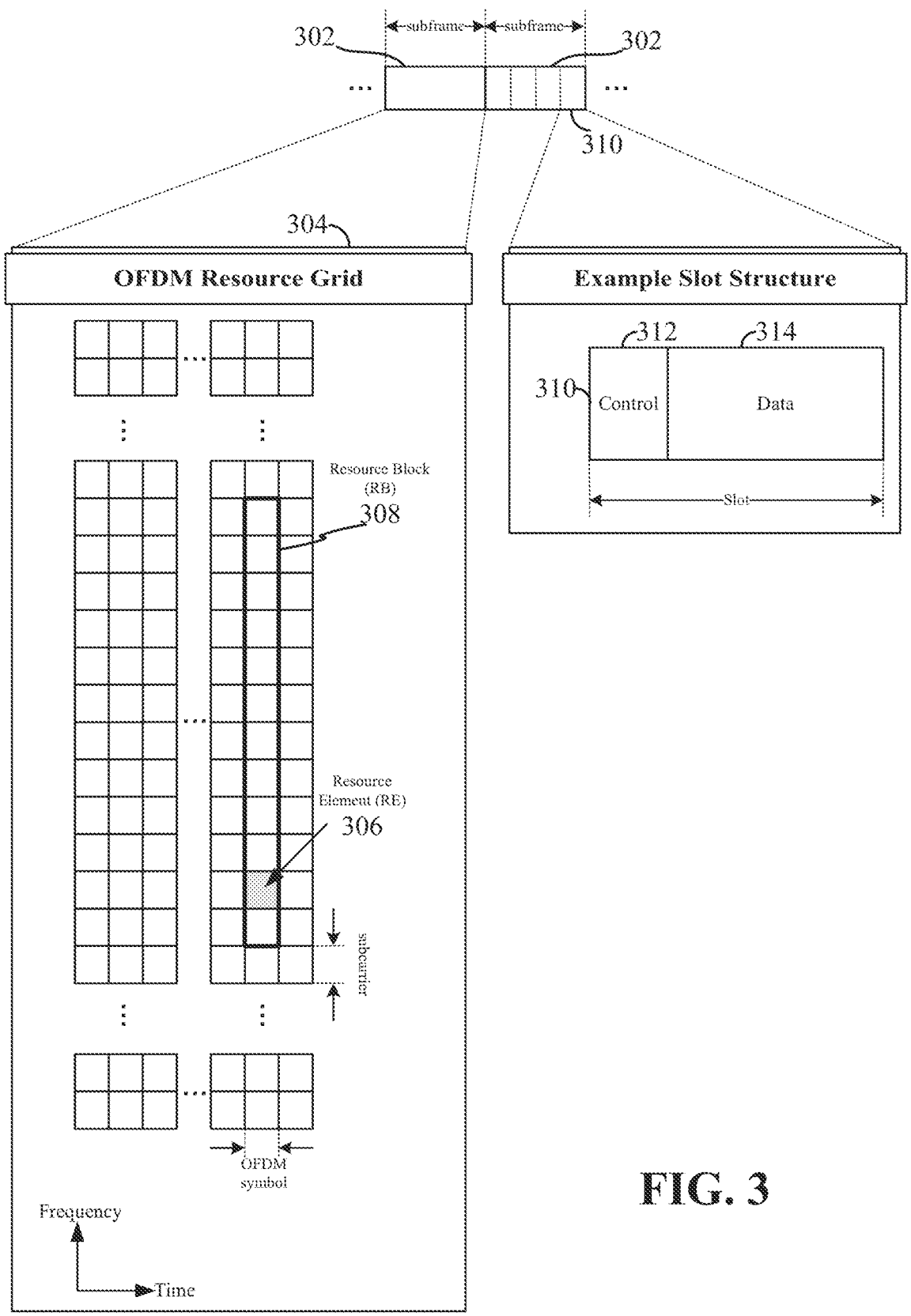
FIG. 3 is a diagram illustrating an orthogonal frequency division multiplexing (OFDM) waveform in wireless communication.

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions.

Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 2 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of resource blocks (RBs) in a given transmission.

Figure 4:
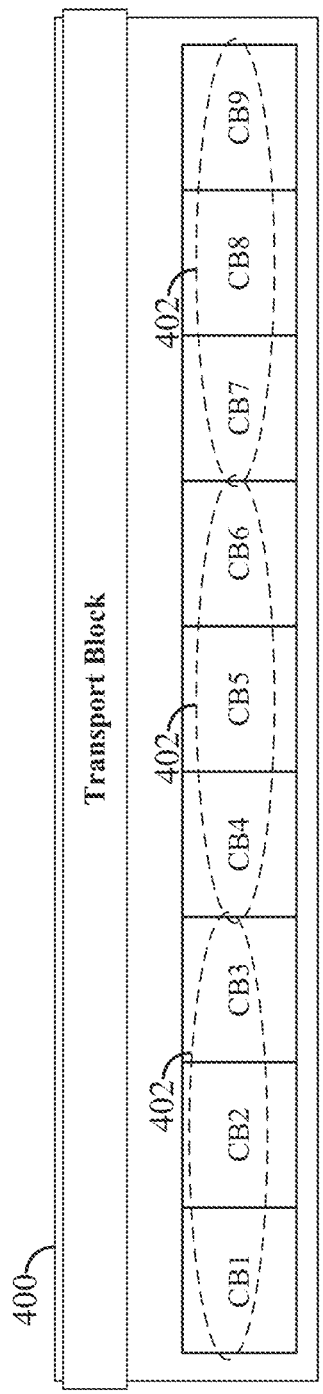
FIG. 4 is a block diagram conceptually illustrating an exemplary transport block according to some aspects of the disclosure.

In a 5G NR network, a transport block (TB) may include multiple code blocks (CBs), which may be grouped or arranged into multiple code block groups. A code block group (CBG) may include one or more CBs. FIG. 4 is a block diagram conceptually illustrating an exemplary TB 400 according to some aspects of the disclosure. The TB 400 includes a plurality of CBs (e.g., CB1, CB2, CB3, . . . CB9 are illustrated in FIG. 4). In other examples, the TB 400 may have more or fewer CBs. The CBs may be grouped into different CBGs (e.g., three CBGs 402 are shown in FIG. 4). In some examples, a CBG may include one CB, all CBs, or any number of CBs in a TB. When one or more CBs are not successfully transmitted to a receiver, more efficient HARQ retransmission may be achieved by retransmitting only the CBG(s) containing the desired CBs, instead of the entire TB. In some aspects of the disclosure, the scheduling entity may use different CBG designs or arrangements for different UEs or scheduled entities.

Figure 5:
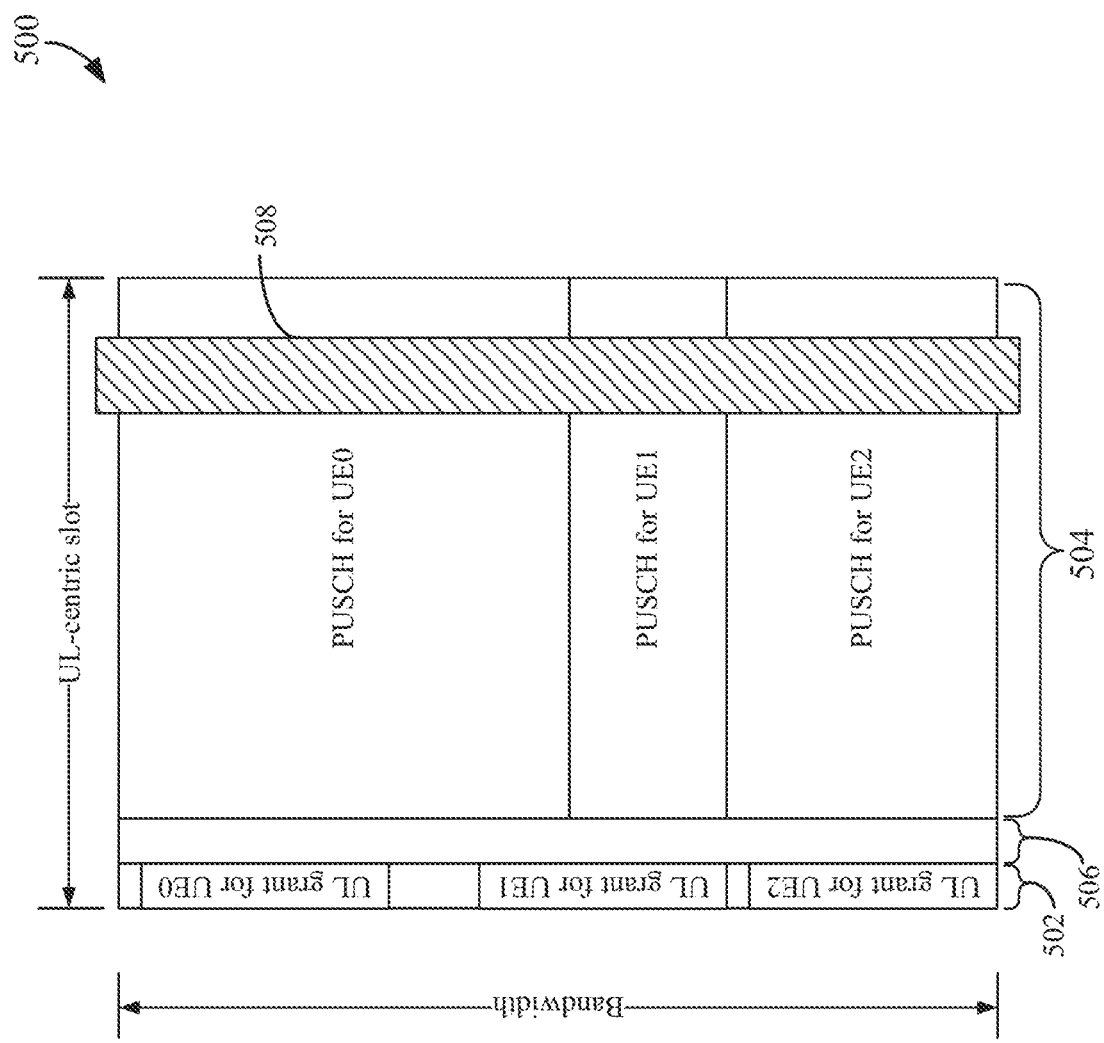
FIG. 5 is a diagram illustrating an uplink slot for wireless communication according to some aspects of the disclosure.

FIG. 5 is a diagram illustrating an uplink (UL) centric slot 500 for wireless communication according to some aspects of the disclosure. In some examples, an UL-centric slot 500 may be utilized for UL data communication between a scheduling entity 108 (e.g., base station, eNB, gNB) and one or more scheduled entities 106 (e.g., UE), or between any devices illustrated in FIGS. 1-2 and/or 6. Multiple UEs can share the UL-centric slot 500. For example, the bandwidth of the slot may be allocated to three UEs (illustrated as UE0, UE1, and UE2) in a frequency division manner. In other examples, the UL-centric slot 500 may be shared by more or fewer UEs. The subbands allocated to the UEs may have the same bandwidth or different bandwidths. The UL-centric slot 500 has a DL control portion 502 and an UL data portion 504 that are separated by a gap 506 or guard period. The guard period can provide time for the UEs to switch or reconfigure their circuitry (e.g., RF chain) between a receiving mode and a transmitting mode. The DL control portion 502 may carry scheduling assignments and other control information. For example, the DL control portion 502 may include a PDCCH that provides various information such as DCI.

In some aspects of the disclosure, the DL control portion 502 (e.g., DCI) may provide a CBG failure mask and CBG-based HARQ feedback for facilitating CB HARQ retransmission in CBG unit.

The UL data portion 504 carries UL payload or user data (e.g., PUSCH) for one or more UEs (e.g., UE0, UE1, UE2). The UL data may correspond to a transport block (TB) that is mapped to a number of time-domain symbols (e.g., OFDM symbols). For example, in FIG. 5, the horizontal direction of the UL-centric slot 500 corresponds to the time domain. In 5G NR, a TB may include a predetermined number of code blocks (e.g., 61 CBs) that are encoded and mapped to the transmitted time domain symbols. The CBs of each PUSCH are arranged into CBGs as illustrated in the example of FIG. 4. The CBs may not be aligned with the OFDM symbols. In that case, a code block (CB) may ride across symbol boundary. Each UL data portion 504 or PUSCH can include different number of CBGs, and the CBGs may have different sizes (i.e., different number of CBs). For example, the PUSCHs of UE0, UE1, and UE2 may carry different CBGs and/or CBs.

In some cases, a bursty interference pattern 508 may interfere with the transmission of some symbols of the UL-centric slot 500. A bursty interference pattern may have a duration significantly shorter than the UL-centric slot. In this case, all UEs sharing the slot may experience similar interference that causes CBG decoding failures at similar CBG locations (e.g., in time domain locations). The bursty interference may be caused, for example, by URLLC traffic or other high priority bursty traffic from other UEs, URLLC traffic of other gNBs, and/or other bursty interference from other nodes in the system.

In CBG-based HARQ retransmission, HARQ retransmission is performed based on CBG units, instead of the entire TB. Therefore, only the CBG that has decoding errors may be retransmitted. To that end, the scheduling entity 108 (e.g., gNB) may transmit a CBG bitmap or mask (e.g., CBG NACK) in a DCI for each error CBG for each UE. The CBG bitmap indicates the CBG(s) that need to be retransmitted. However, if the scheduling entity transmits separate DCI to each UE for the CBGs to be retransmitted, there may be significant signaling control overhead. Therefore, it is beneficial to reduce the signaling overhead of CBG-based HARQ retransmissions.

Figure 6:
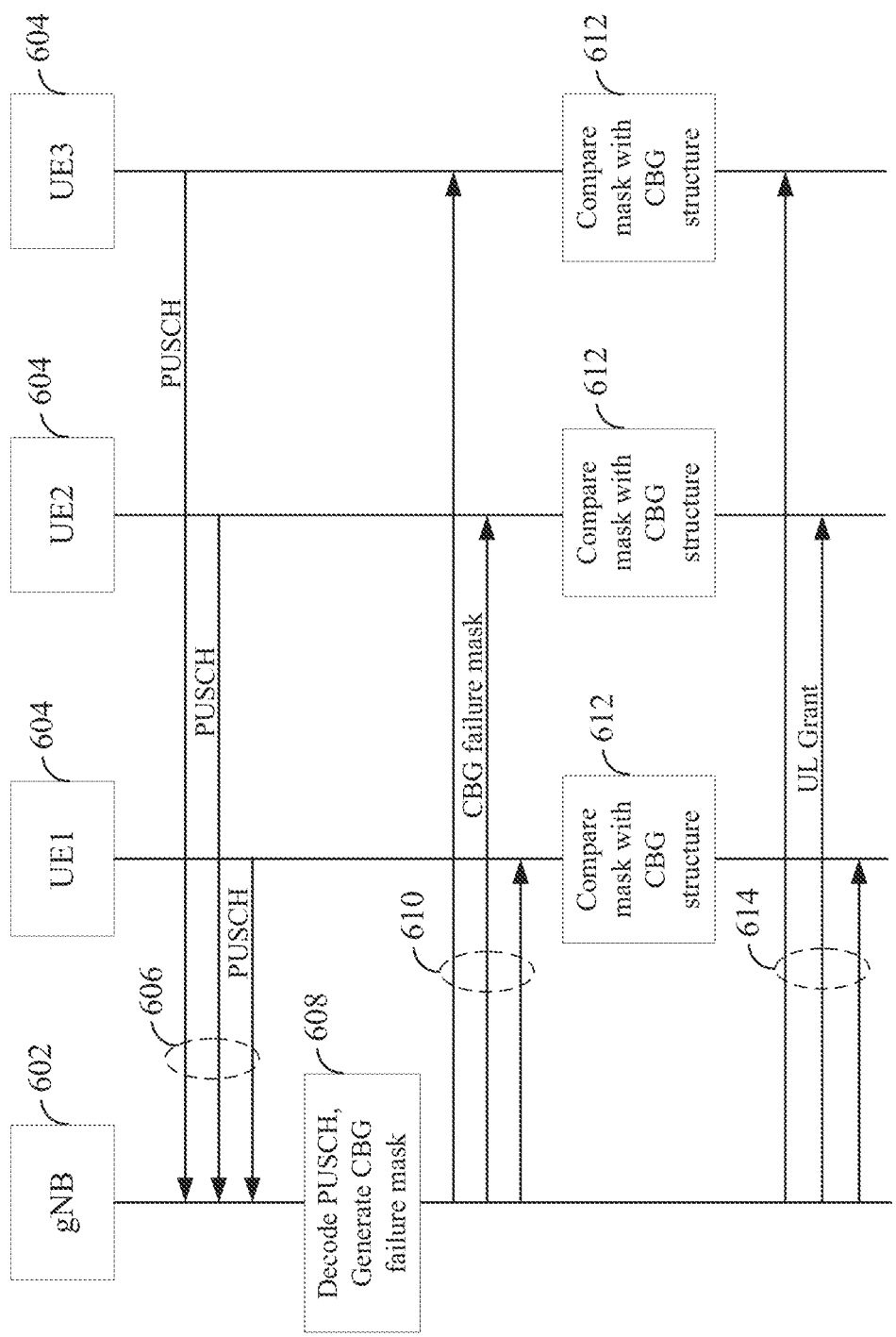
FIG. 6 is a diagram illustrating a code block group (CBG) based retransmission process utilizing a CBG failure mask according to some aspects of the disclosure.

FIG. 6 is a diagram illustrating a CBG-based HARQ process utilizing a CBG failure mask according to some aspects of the disclosure. As described below, some or all illustrated features may be omitted in a particular implementation within the scope of the present disclosure, and some illustrated features may not be required for implementation of all embodiments. Referring to FIG. 6, a scheduling entity (e.g., gNB 602) may be in wireless communication with a number of scheduled entities 604 (e.g., UE1, UE2, UE3). The gNB 602 may be the scheduling entity 108, and the UEs 604 may be the scheduled entities 106 illustrated in FIG. 1.

The UEs 604 (e.g., UE1, UE2, UE3) may share an UL-centric slot to transmit UL data 606 to the gNB 602. For example, the UL slot may be the same as the UL-centric slot 500 described in relation to FIG. 5. In this case, each UE's PUSCH 606 may be allocated to a different bandwidth or subband. The gNB 602 receives and decodes the PUSCHs from each UE and identifies any CBG that has a decoding error. For example, the decoding error may be caused by a bursty interference pattern similar to the bursty interference 508 shown in FIG. 5. In that case, the UEs may experience similar interference to their CBGs in similar locations (e.g., time-domain symbols) of the slot. Based on the decoding errors, if any, the gNB can determine the CBGs that need to be retransmitted in a CBG-based HARQ process from one or more of the UEs. To that end, the gNB may transmit CBG NACKs to the UEs.

Figure 7:
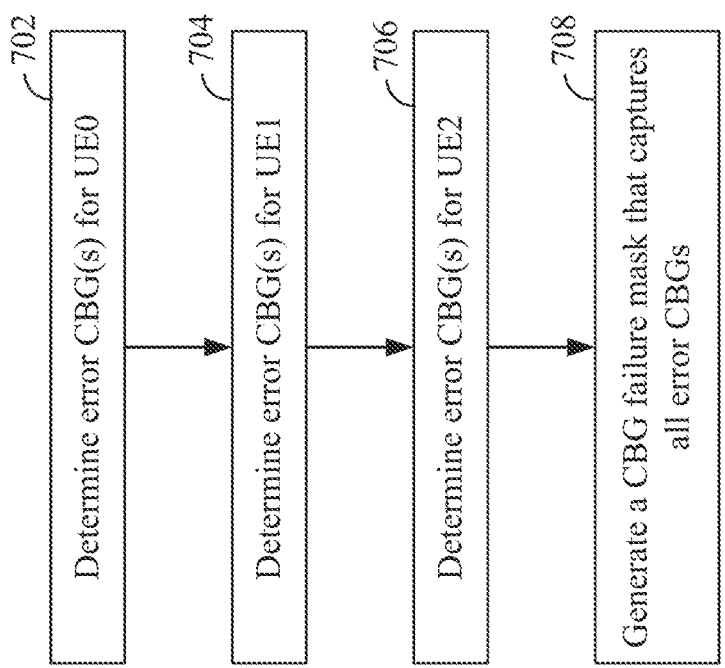
FIG. 7 is a diagram illustrating an exemplary process for generating a CBG failure mask according to some aspects of the disclosure.

FIG. 7 is a diagram illustrating an exemplary process for generating a CBG failure mask according to some aspects of the disclosure. At block 702, the gNB determines the error CBG(s) of UE0. At block 704, the gNB determines the error CBG(s) of UE1. At block 706, the gNB determines the error CBG(s) of UE2. An error CBG is a CBG that includes at least one CB that is not received and/or decoded successfully by the receiver. The process of FIG. 7 may be adapted to generate a CBG failure mask of more or fewer UEs. At block 708, the gNB generates a CBG failure mask that captures all the CBG NACKs for the UEs 604. In some examples, the CBG failure mask may indicate the UL resource or symbols corresponding to the CBGs with decoding errors. Based on the information of the CBG failure mask, each UE can determine the corresponding CBG(s) to be retransmitted using a CBG-based HARQ process. Referring back to FIG. 6, the gNB may transmit the CBG failure mask to the UEs, for example, in a group DCI 610 that is in a common or group search space of the UEs. The search space indicates the set of control channel elements locations where the UE may find its DL control channel (e.g., PDCCH). Each control channel element (CCE) includes a certain number of resource element groups, and one resource element group (REG) corresponds to a certain number of resource elements. Signaling overhead may be reduced by using the group DCI.

In some examples, the transmission timing of the CBG failure mask may be fixed with respect to the PUSCH transmission. In another example, the transmission timing of the CBG failure mask may be flexible. In that case, the group DCI 610 may include an index or value to indicate the corresponding PUSCH slot.

Figure 8:
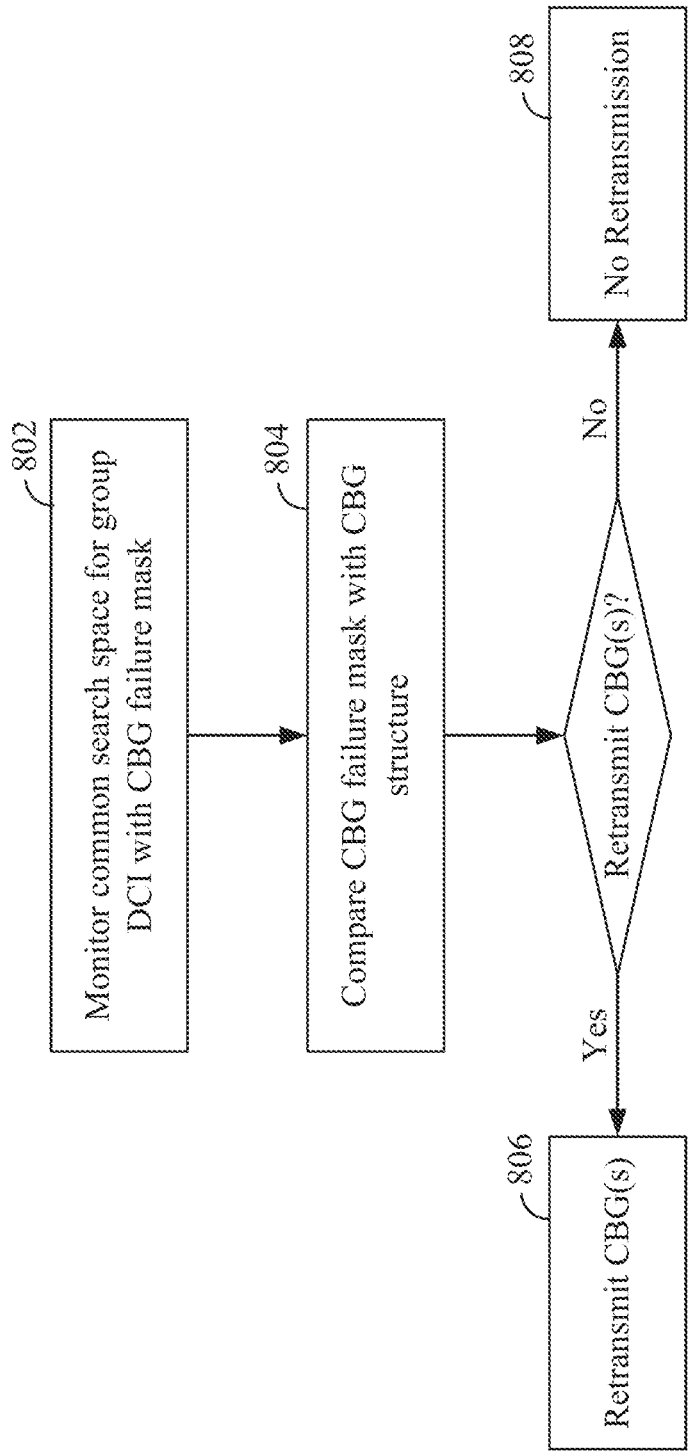
FIG. 8 is a diagram illustrating an exemplary process for determining a CBG for retransmission using a CBG failure mask according to some aspects of the disclosure.

In some aspects of the disclosure, with reference to FIG. 8, at block 802 each UE 604 monitors the common search space for the group DCI 610. Once a group DCI 610 is received, at block 804 the UE compares the CBG failure mask with its CBG structure to determine which CBGs or CBs, if any, need to be retransmitted. If the CBG failure mask covers one or more CBGs of the UE, at block 806 the UE may transmit the CBG(s) using a HARQ retransmission process; otherwise, at block 808 the UE does not retransmit any CBG.

Figure 9:
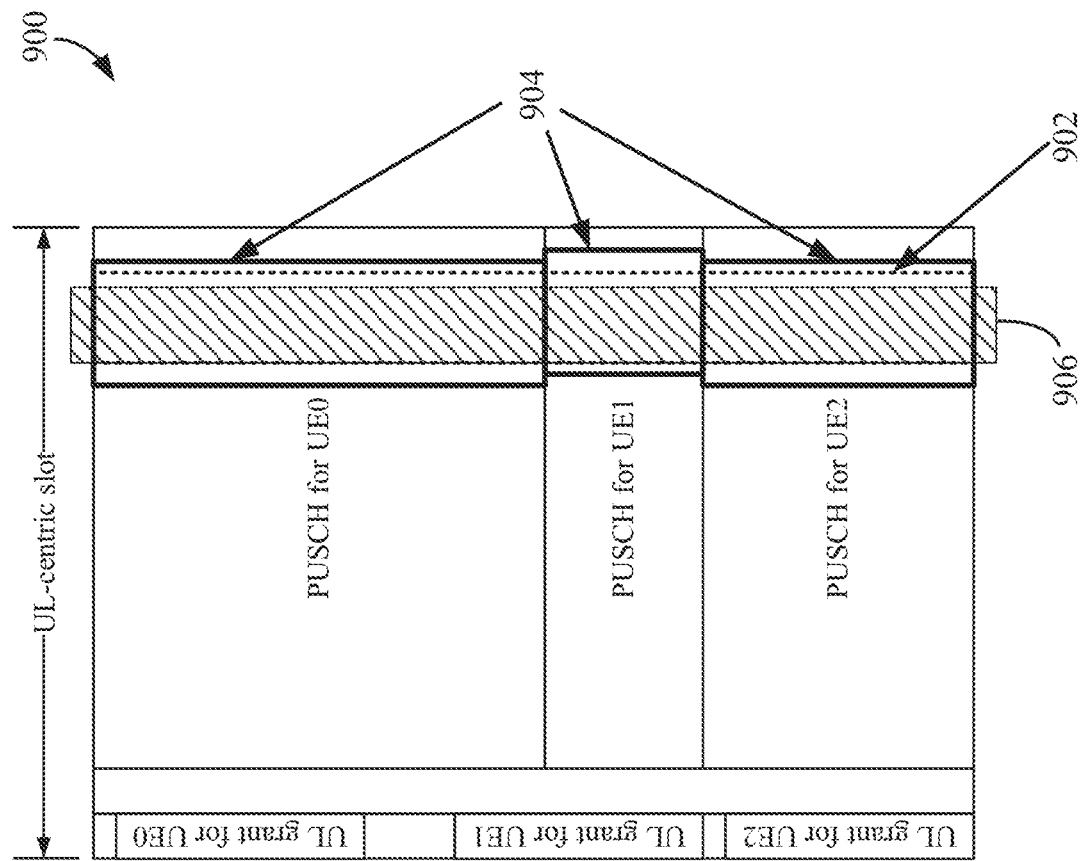
FIG. 9 is a diagram illustrating an exemplary CBG failure mask for an uplink slot according to some aspects of the disclosure.

FIG. 9 is a diagram illustrating an exemplary CBG failure mask for an UL-centric slot 900 according to some aspects of the disclosure. The CBG failure mask 902 is common across all UEs (e.g., UE0, UE1, UE2). Based on the CBG failure mask 902, each UE can determine its CBG(s) 904 that need to be retransmitted due to bursty interference 906. The CBGs 904 to be retransmitted may be different in size and/or location among the UEs.

Referring back to FIG. 6, the gNB 602 may transmit a unicast UL retransmission grant 614 (e.g., another DCI) to each UE 604 to trigger CBG retransmission. If a UE has no CBG decoding error or CBG NACK, the gNB 602 may not transmit a retransmission grant to this particular UE. In some aspects of the disclosure, the group DCI 610 with the CBG failure mask may or may not be transmitted in the same slot as the UL retransmission grant 614. However, the group DCI 610 is transmitted no later than the UL retransmission grant 614.

In some aspects of the disclosure, the retransmission grant DCI 614 may include a bit, flag, or value to indicate whether the retransmission grant follows a CBG failure mask or not. If it indicates that the retransmission grant does not follow a CBG failure mask, the UE may perform HARQ retransmission at the TB level.

Figure 10:
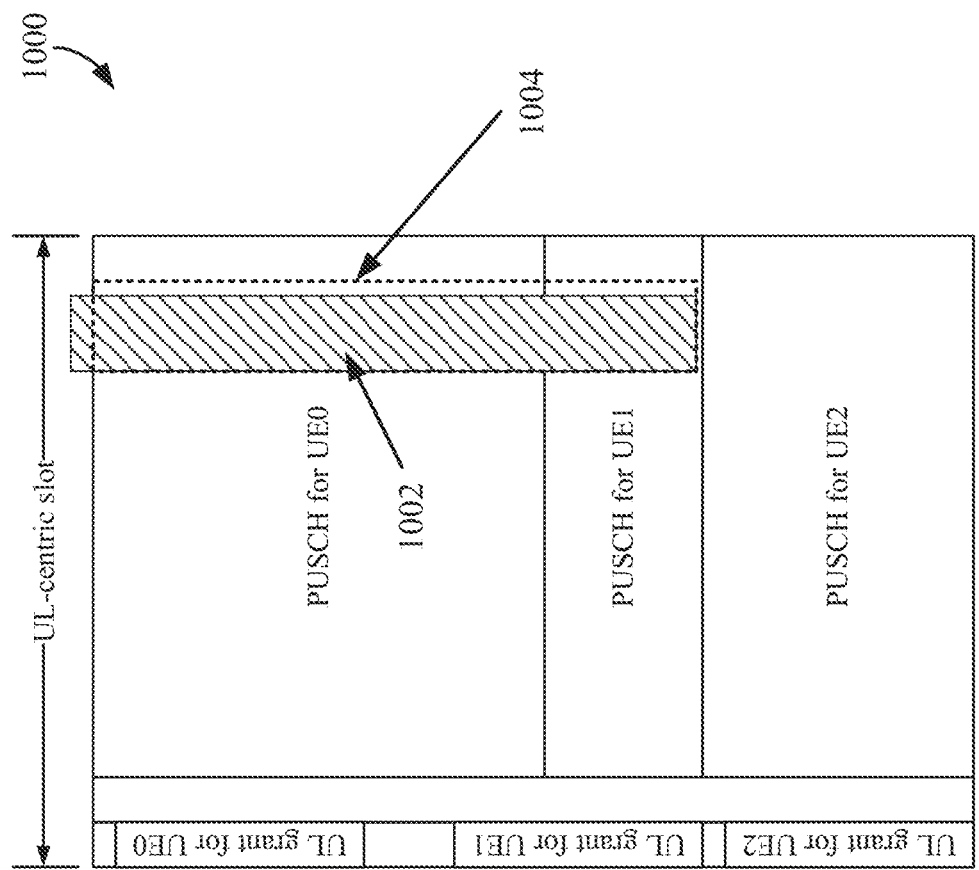
FIG. 10 is a diagram illustrating another exemplary CBG failure mask for an uplink slot according to some aspects of the disclosure.

In some examples, different PUSCHs or UL data from different UEs may have very different interference patterns. It may be the case when the interference affects one or more subbands, but not the entire bandwidth. For example, with reference to FIG. 10, the bursty interference 1002 affects the PUSCHs of UE0 and UE1, but not UE2. In that case, UEs scheduled on different subbands may experience different CBG interference patterns. If a CBG failure mask covers the entire bandwidth, the mask may become too wide and cause a lot number of CBGs to be retransmitted unnecessarily. In this example, the CBG failure mask 1004 may cover only the bandwidth of UE0 and UE1.

It some examples, some UEs in a cell may not be affected by bursty interference, especially when the interference comes from a neighbor cell. In that case, some UE near that neighbor cell may be affected while other UEs further away from that cell may not be affected. The UEs that are not affected may be signaled differently such that they may not follow the CBG failure mask. For example, the gNB may not transmit the CBG failure mask to these UEs.

In some aspects of the disclosure, multiple CBG failure masks may be used to handle scenarios in which the UEs experience substantially different interference patterns. In one example, the gNB may transmit multiple CBG failure masks in separate DCIs. A UE can be configured to monitor one or multiple DCIs. For example, a UE may monitor one CBG failure mask DCI and generates the CBG retransmission set based on the monitored DCI. In another example, a UE may monitor multiple CBG failure mask DCIs, and the retransmission grant DCI may indicate which one of the CBG failure mask to use to generate the CBG retransmission set. Because the gNB is aware of the CBG error pattern of the UE, the gNB can direct the UE to a CBG failure mask to minimize the retransmitted CBG(s).

In another example, multiple CBG failure masks may be included in the same CBG failure mask DCI. In the UL retransmission DCI grant, the gNB can indicate to the UE which mask out of the many to be used. Alternatively, the masks can be configured to be subband dependent, and the UE can pick the mask(s) based on its PUSCH subband(s).

Figure 11:
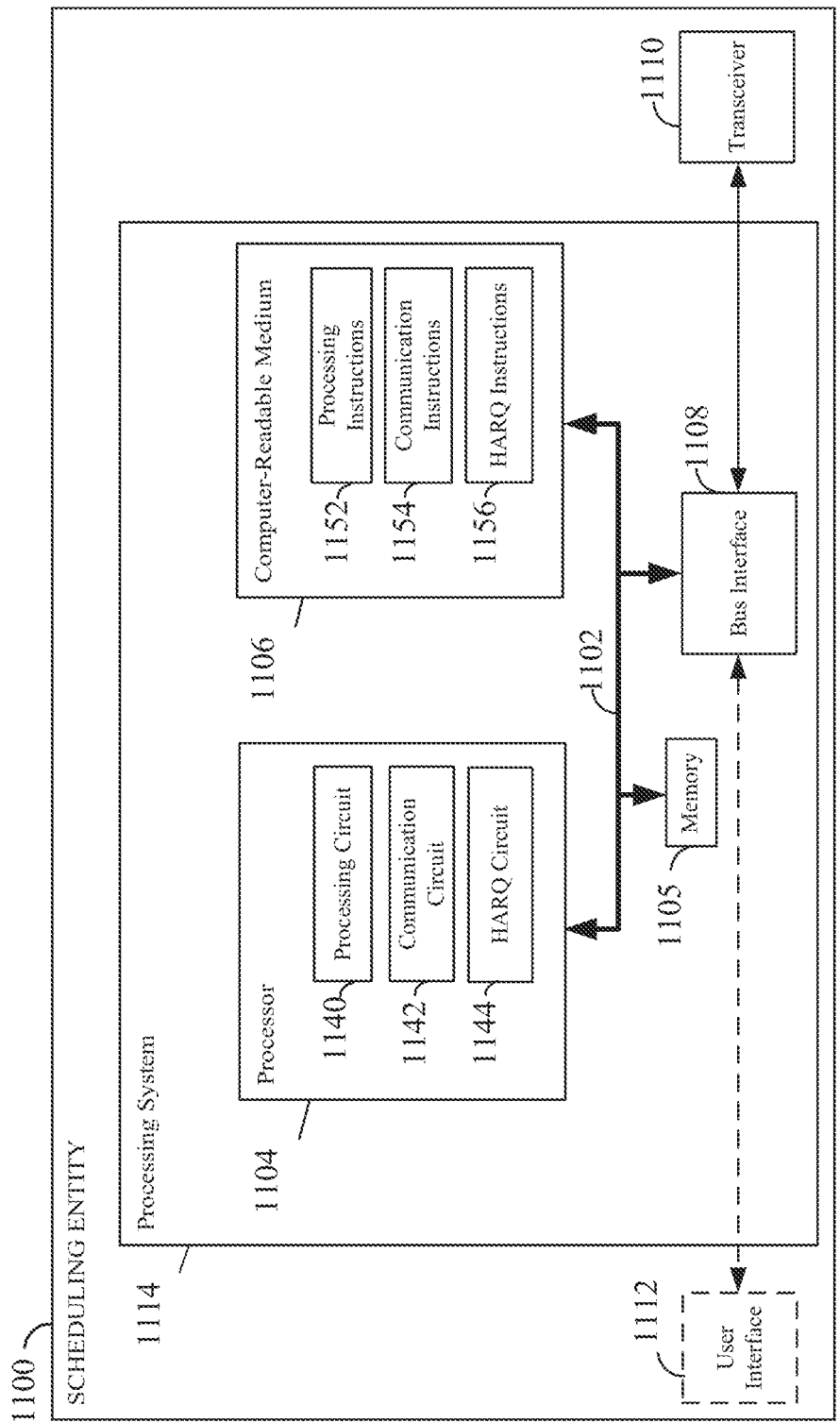
FIG. 11 is a block diagram conceptually illustrating an example of a hardware implementation for a scheduling entity according to some aspects of the disclosure.

FIG. 11 is a block diagram illustrating an example of a hardware implementation for a scheduling entity 1100 employing a processing system 1114. For example, the scheduling entity 1100 may be a user equipment (UE) as illustrated in any one or more of FIGS. 1, 2, and/or 6. In another example, the scheduling entity 1100 may be a base station as illustrated in any one or more of FIGS. 1, 2, and/or 6.

The scheduling entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes and procedures described in relation to FIGS. 4-10 and 12.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

In some aspects of the disclosure, the processor 1104 may include circuitry (e.g., a processing circuit 1140, a communication circuit 1142, and a HARQ circuit 1144) configured for various functions, including, for example, CBG based HARQ retransmission. For example, the circuitry may be configured to implement one or more of the functions and processes described in relation to FIG. 12.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1106 may include software (e.g., processing instructions 1152, communication instructions 1154, and HARQ instructions 1156) configured for various functions, including, for example, CBG based HARQ retransmission. For example, the software may be configured to implement one or more of the functions described in relation to FIG. 12.

Figure 12:
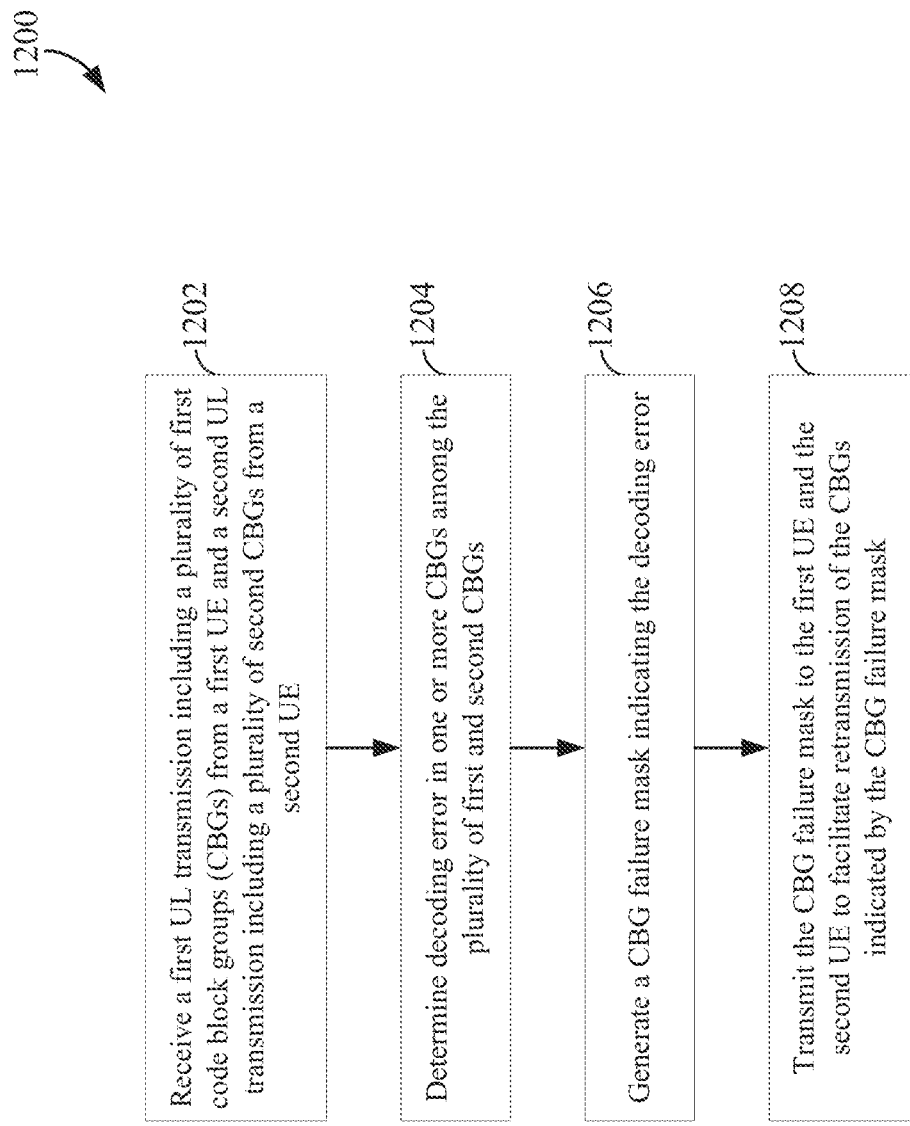
FIG. 12 is a flow chart illustrating an exemplary process for wireless communication at a scheduling entity utilizing a CBG failure mask according to some aspects of the disclosure.

FIG. 12 is a flow chart illustrating an exemplary process 1200 for wireless communication at a scheduling entity utilizing a CBG failure mask according to some aspects of the disclosure. As described below, some or all illustrated features may be omitted in a particular implementation within the scope of the present disclosure, and some illustrated features may not be required for implementation of all embodiments. In some examples, the process 1200 may be carried out by the scheduling entity 108 and/or scheduled entity 106 illustrated in FIG. 1. In some examples, the process 1200 may be carried out by any suitable apparatus or means for carrying out the functions or algorithm described below.

At block 1202, with reference to FIG. 11, a scheduling entity 1100 utilizes a communication circuit 1142 and a transceiver 1110 to receive a first UL transmission including a plurality of first CBGs from a first UE and a second UL transmission comprising a plurality of second CBGs from a second UE. For example, the first and second UEs may any UEs illustrated in FIG. 6. In one example, the first UL transmission and second UL transmission may be the PUSCHs 606 illustrated in FIG. 6.

At block 1204, the scheduling entity 1100 utilizes a processing circuit 1140 to determine decoding error in one or more CBGs among the plurality of first and second CBGs. For example, the decoding error of the CBGs may be caused by a bursty interference pattern (e.g., bursty interference 508 shown in FIG. 5). Decoding error may occur when the scheduled entity failed to receive and/or decode the UL transmission to recover the transmitted data carried by the CBGs.

At block 1206, the scheduling entity utilizes a HARQ circuit 1144 to generate a CBG failure mask that indicates the decoding error of the CBGs. The CBG failure mask may include a time-frequency domain region (e.g., one or more time-frequency resource elements) that are designed for CBG based retransmission. For example, the CBG failure mask may include multiple bits or a bitmap that indicates the time-frequency domain region or CBGs that have decoding error for both the first UE and second UE.

At block 1208, the scheduling entity utilizes the communication circuit 1142 and transceiver 1110 to transmit the CBG failure mask to the first UE and the second UE to facilitate retransmission of the CBGs indicated by the CBG failure mask. In one example, the CBG failure mask may be included in a group DCI destined to the first UE and second UE. The scheduling entity may transmit the DCI containing the CBG failure mask using a PDCCH in a common search space that is monitored by both first UE and second UE. Using the CBG failure mask, the scheduling entity may signal the CBG errors to multiple UEs in a single DCI, and hence reducing signaling overhead.

Although the above exemplary process 1200 has been described using two UEs, the process may be modified and adapted for more UEs according to other aspects of the present disclosure. In some examples, the scheduling entity may transmit multiple CBG failure mask DCIs for different subbands or different groups of UEs.

Figure 13:
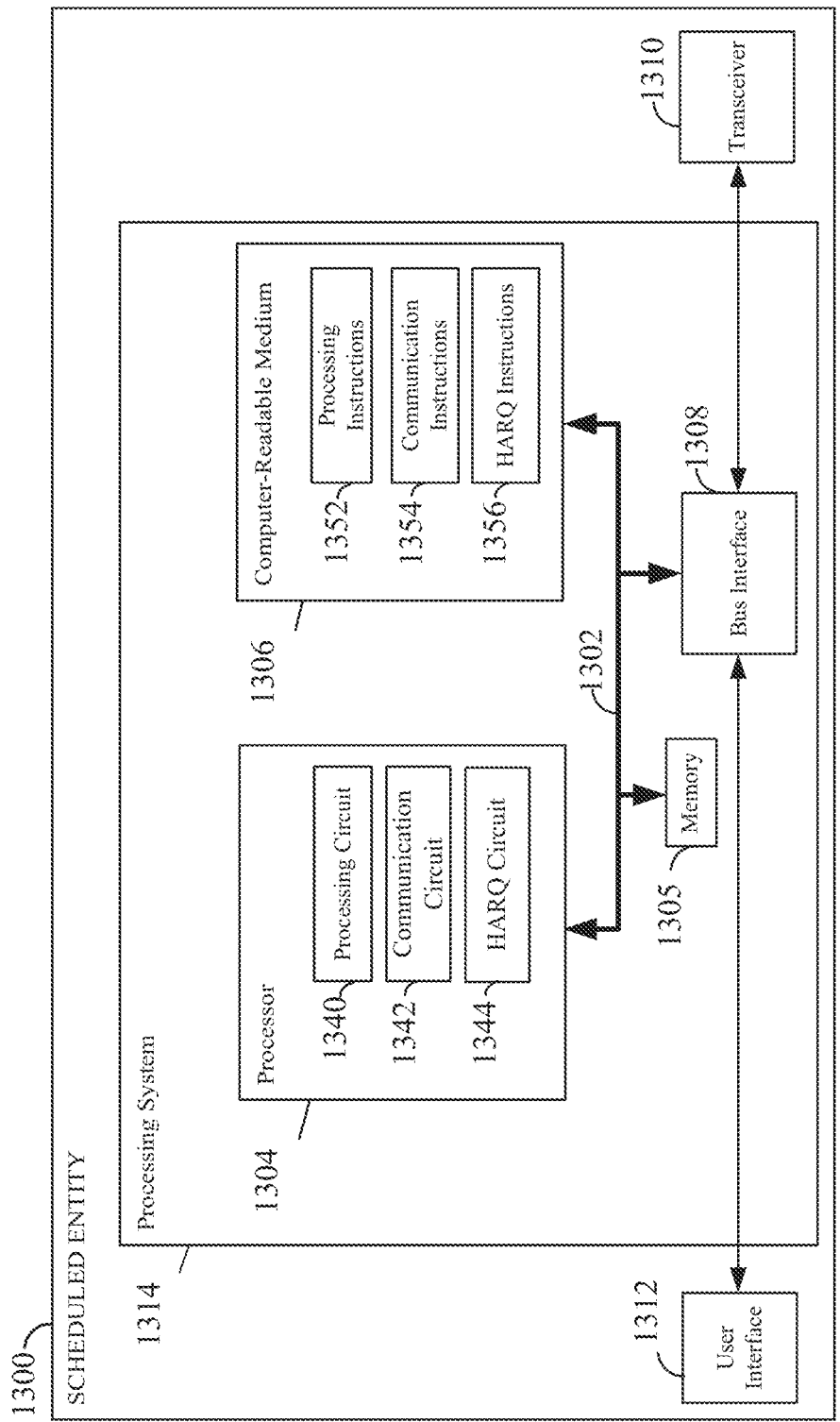
FIG. 13 is a block diagram conceptually illustrating an example of a hardware implementation for a scheduled entity according to some aspects of the disclosure.

FIG. 13 is a conceptual diagram illustrating an example of a hardware implementation for an exemplary scheduled entity 1300 employing a processing system 1314. In accordance with various aspects of the disclosure, an element, or any portion of an element, or any combination of elements may be implemented with a processing system 1314 that includes one or more processors 1304. For example, the scheduled entity 1300 may be a user equipment (UE) as illustrated in any one or more of FIGS. 1, 2, and/or 6.

The processing system 1314 may be substantially the same as the processing system 1114 illustrated in FIG. 11, including a bus interface 1308, a bus 1302, memory 1305, a processor 1304, and a computer-readable medium 1306. Furthermore, the scheduled entity 1300 may include a user interface 1312 and a transceiver 1310 substantially similar to those described above in FIG. 11. That is, the processor 1304, as utilized in a scheduled entity 1300, may be used to implement any one or more of the processes described in relation to FIGS. 6-9 and 14.

In some aspects of the disclosure, the processor 1304 may include circuitry (e.g., a processing circuit 1340, a communication circuit 1342, a HARQ circuit 1344) configured for various functions, including, for example, CBG based HARQ retransmission. For example, the circuitry may be configured to implement one or more of the functions described in relation to FIG. 14. In one or more examples, the computer-readable storage medium 1306 may include software (e.g., processing instructions 1352, communication instructions 1354, and HARQ instructions 1356) configured for various functions, including, for example, CBG based HARQ retransmission. For example, the software may be configured to implement one or more of the functions described in relation to FIG. 14.

Figure 14:
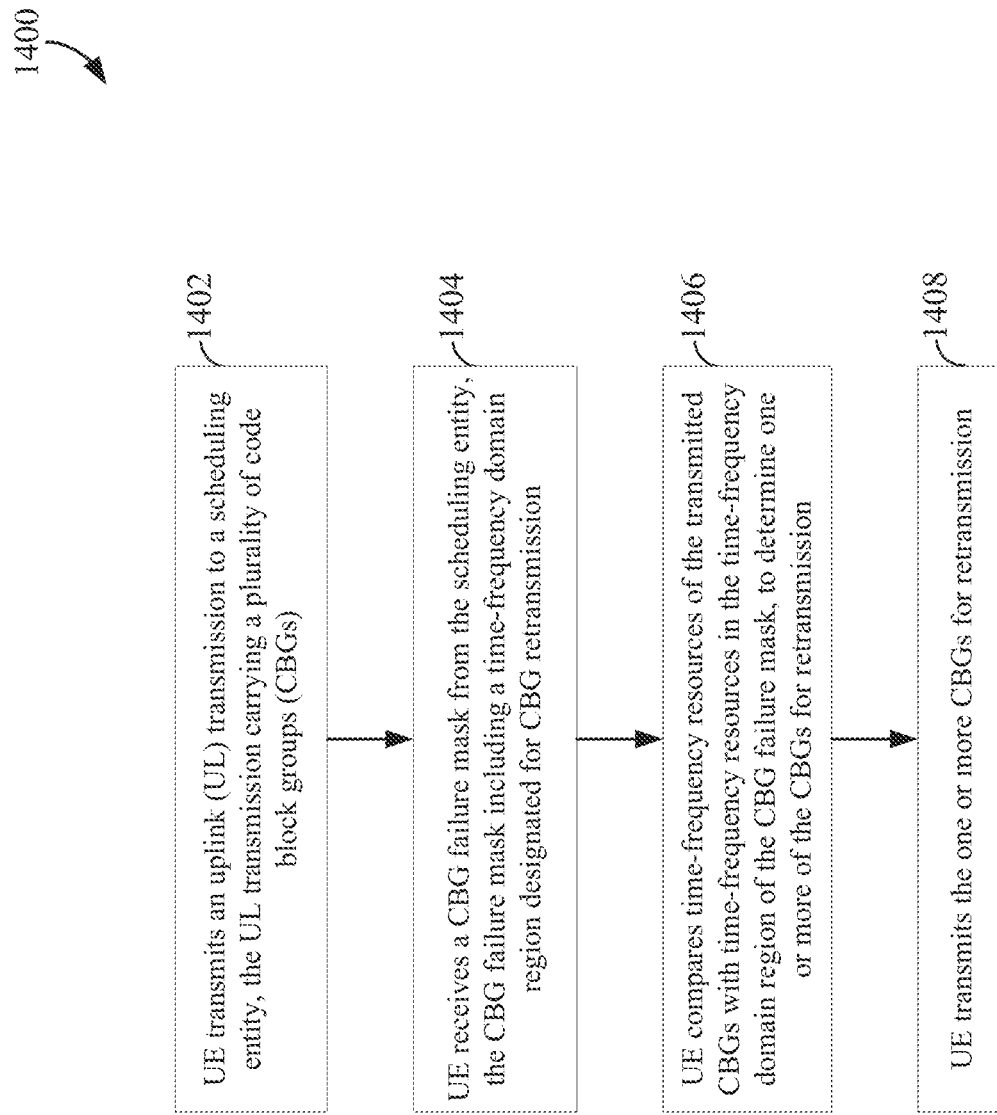
FIG. 14 is a flow chart illustrating an exemplary process for wireless communication at a user equipment utilizing a CBG failure mask according to some aspects of the disclosure.

FIG. 14 is a flow chart illustrating an exemplary process 1400 for wireless communication at a UE utilizing a CBG failure mask according to some aspects of the disclosure. As described below, some or all illustrated features may be omitted in a particular implementation within the scope of the present disclosure, and some illustrated features may not be required for implementation of all embodiments. In some examples, the process 1400 may be carried out by the scheduling entity 108 and/or scheduled entity 106 illustrated in FIG. 1. In some examples, the process 1400 may be carried out by any suitable apparatus or means for carrying out the functions or algorithm described below.

At block 1402, with reference to FIG. 13, a first UE utilizes a communication circuit 1342 and a transceiver 1310 to transmit an UL transmission to a scheduling entity (e.g., gNB). The UL transmission carries a plurality of CBGs. In one example, the first UE may be one of the UEs in FIG. 6.

At block 1404, the first UE utilizes the communication circuit 1342 to receive a CBG failure mask from the scheduled entity, and the CBG failure mask includes a time-frequency domain region (e.g., one or more time-frequency resource elements) designed for CBG retransmission. The CBG failure mask may be similar to that shown in FIG. 9 or 10. That is, the CBGs of the UL transmission within the time-frequency domain region may have decoding error and need to be retransmitted. For example, the decoding error of the CBGs may be caused by a bursty interference pattern similar to that shown in FIG. 5.

At block 1406, the UE compares the time-frequency resources of the transmitted CBGs with the time-frequency resources in the CBG failure mask, to determine one or more of the CBGs for retransmission. The UE may utilize the HARQ circuit 1344 to determine the CBGs for retransmission.

At block 1408, after receiving an UL grant from the scheduling entity, the UE can transmit the one or more CBGs for retransmission as indicated by the CBG failure mask. Using the CBG failure mask, the scheduling entity can indicate CBG decoding error of multiple UEs using a single DCI (e.g., group DCI). Using the above described processes, CBG based HARQ retransmission efficiency may be increased, and signaling overhead may be reduced.

In one configuration, the apparatus 1100 and/or 1300 for wireless communication includes means for performing various functions and processes described in relation to FIGS. 5-10, 12, and 14. In one aspect, the aforementioned means may be the processor 1104 and/or 1304 in which the invention resides in FIGS. 5-10, 12, and 14, configured to perform the functions recited by the aforementioned means. In another aspect, the aforementioned means may be a circuit or any apparatus configured to perform the functions recited by the aforementioned means.

Of course, in the above examples, the circuitry included in the processor 1304 and/or 1404 is merely provided as an example, and other means for carrying out the described functions may be included within various aspects of the present disclosure, including but not limited to the instructions stored in the computer-readable storage medium 1306 and/or 1406, or any other suitable apparatus or means described in any one of the FIGS. 1, 2, and/or 6, and utilizing, for example, the processes and/or algorithms described herein in relation to FIGS. 5-10, 12, and 14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduling entity, comprising:
   receiving a first uplink (UL) transmission comprising a plurality of first code block groups (CBGs) from a first user equipment (UE) and a second UL transmission comprising a plurality of second CBGs from a second UE;
   determining decoding error in one or more CBGs among the first and second CBGs;
   generating a CBG failure mask indicating the decoding error, the CBG failure mask configured to indicate one or more time-frequency domain regions covering the one or more CBGs with the decoding error; and
   transmitting the CBG failure mask to the first UE and the second UE to facilitate retransmission of the CBGs indicated by the CBG failure mask.

2. The method of claim 1, wherein one or more CBGs from the first UE are different in sizes from one or more CBGs from the second UE.

3. The method of claim 1, wherein the receiving comprises:
   receiving the first UL transmission in a first subband; and
   receiving the second UL transmission in a second subband that is different from the first subband.

4. The method of claim 1, further comprising:
   transmitting a first retransmission grant to the first UE; and
   transmitting a second retransmission grant, separated from the first retransmission grant, to the second UE,
   wherein the CBG failure mask is transmitted in a first slot, and
   wherein the first retransmission grant or the second retransmission grant is transmitted in the first slot or a later slot.

5. The method of claim 4, wherein the first retransmission grant and the second retransmission grant are configured to indicate at least one of the existence or location of the corresponding CBG failure mask.

6. The method of claim 1, wherein the transmitting comprises:
   transmitting the CBG failure mask in a common search space of the first UE and the second UE.

7. The method of claim 1, wherein the CBG failure mask comprises a first CBG failure mask used by the first UE and a second CBG failure mask used by the second UE.

8. The method of claim 7, further comprising:
   transmitting a first retransmission grant to the first UE, wherein the first retransmission grant signals the first UE to utilize the first CBG failure mask, wherein the first CBG failure mask is associated with a first subband for transmitting the first UL transmission; and
   transmitting a second retransmission grant to the second UE, wherein the second retransmission grant signals the second UE to utilize the second CBG failure mask, wherein the second CBG failure mask is associated with a second subband for transmitting the second UL transmission.

9. The method of claim 1, wherein the transmitting comprises:
   transmitting a first CBG failure mask in a first control message to a first set of UEs including the first UE; and
   transmitting a second CBG failure mask in a second control message to a second set of UEs including the second UE.

10. The method of claim 9, further comprising:
    transmitting a first retransmission grant to signal the first UE to utilize the first CBG failure mask; and
    transmitting a second retransmission grant to signal the second UE to utilize the second CBG failure mask.

11. The method of claim 1, wherein the CBG failure mask comprises a bitmap that indicates the time-frequency domain regions covering the one or more CBGs with the decoding error.

12. A method of wireless communication operable at a first user equipment (UE), comprising:
transmitting an uplink (UL) transmission to a scheduling entity, the UL transmission carrying a plurality of code block groups (CBGs);
receiving a CBG failure mask from the scheduling entity, the CB G failure mask comprising a time-frequency domain region designated for CBG retransmission;
comparing time-frequency resources of the transmitted CBGs with time-frequency resources in the time-frequency domain region of the CBG failure mask, to determine one or more of the CBGs for retransmission; and
transmitting the one or more CBGs for retransmission.

13. The method of claim 12, wherein the transmitting the UL transmission comprises:
transmitting the UL transmission in a first subband that is different from a second subband allocated to a second UE that receives the same CBG failure mask.

14. The method of claim 12, further comprising:
receiving a first retransmission grant, separated from a second retransmission grant for a second UE, from the scheduling entity, wherein the CBG failure mask comprises a first CBG failure mask for the first UE and a second CBG failure mask for the second UE,
wherein the first retransmission grant signals the first UE to utilize the first CBG failure mask for CBG retransmission using a CBG based retransmission process, and
wherein the second retransmission grant signals the second UE to utilize the second CBG failure mask for CBG retransmission using a CBG based retransmission process.

15. The method of claim 14,
wherein the CBG failure mask is received in a first slot, and
wherein the first retransmission grant is received in the first slot or a second slot later than the first slot.

16. The method of claim 12, wherein the receiving comprises:
receiving the CBG failure mask in a common search space of the first UE and a second UE that receives the same CBG failure mask.

17. The method of claim 12, wherein the CBG failure mask comprises a bitmap that indicates the time-frequency domain regions covering the one or more CBGs with the decoding error.

18. A scheduling entity, comprising:
a communication interface configured to communicate with a first user equipment (UE) and a second UE;
a memory; and
a processor operatively coupled to the communication interface and the memory,
wherein the processor and the memory are configured to:
receive a first uplink (UL) transmission comprising a plurality of first code block groups (CBGs) from the first UE and a second UL transmission comprising a plurality of second CBGs from the second UE;
determine decoding error in one or more CBGs among the first and second CBGs;
generate a CBG failure mask indicating the decoding error, the CBG failure mask configured to indicate one or more time-frequency domain regions covering the one or more CBGs with the decoding error; and
transmit the CBG failure mask to the first UE and the second UE to facilitate retransmission of the CBGs indicated by the CBG failure mask.

19. The scheduling entity of claim 18, wherein one or more CBGs from the first UE are different in sizes from one or more CBGs from the second UE.

20. The scheduling entity of claim 18, wherein the processor and the memory are further configured to:
receive the first UL transmission in a first subband; and
receive the second UL transmission in a second subband that is different from the first subband.

21. The scheduling entity of claim 18, wherein the processor and the memory are further configured to:
transmit a first retransmission grant to the first UE; and
transmit a second retransmission grant, separated from the first retransmission grant, to the second UE,
wherein the CBG failure mask is transmitted in a first slot, and
wherein the first retransmission grant or the second retransmission grant is transmitted in the first slot or a later slot.

22. The scheduling entity of claim 21, wherein the first retransmission grant and the second retransmission grant are configured to indicate at least one of the existence or location of the corresponding CBG failure mask.

23. The scheduling entity of claim 18, wherein the processor and the memory are further configured to:
transmit the CBG failure mask in a common search space of the first UE and the second UE.

24. The scheduling entity of claim 18, wherein the CBG failure mask comprises a first CBG failure mask used by the first UE and a second CBG failure mask used by the second UE.

25. The scheduling entity of claim 24, wherein the processor and the memory are further configured to:
transmit a first retransmission grant to the first UE, wherein the first retransmission grant signals the first UE to utilize the first CBG failure mask, wherein the first CBG failure mask is associated with a first subband for transmitting the first UL transmission; and
transmit a second retransmission grant to the second UE, wherein the second retransmission grant signals the second UE to utilize the second CBG failure mask, wherein the second CBG failure mask is associated with a second subband for transmitting the second UL transmission.

26. The scheduling entity of claim 18, wherein the processor and the memory are further configured to:
transmit a first CBG failure mask in a first control message to a first set of UEs including the first UE; and
transmit a second CBG failure mask in a second control message to a second set of UEs including the second UE.

27. The scheduling entity of claim 26, wherein the processor and the memory are further configured to:
transmit a first retransmission grant to signal the first UE to utilize the first CBG failure mask; and
transmit a second retransmission grant to signal the second UE to utilize the second CBG failure mask.

28. A first user equipment (UE), comprising:
a communication interface configured to communicate with a scheduling entity;
a memory; and
a processor operatively coupled to the communication interface and the memory,
wherein the processor and the memory are configured to:
transmit an uplink (UL) transmission to the scheduling entity, the UL transmission carrying a plurality of code block groups (CBGs);

receive a CBG failure mask from the scheduling entity, the CBG failure mask comprising a time-frequency domain region designated for CBG retransmission;

compare time-frequency resources of the transmitted CBGs with time-frequency resources in the time-frequency domain region of the CBG failure mask, to determine one or more of the CBGs for retransmission; and transmit the one or more CBGs for retransmission.

29. The first UE of claim 28, wherein the processor and the memory are further configured to:

transmit the UL transmission in a first subband that is different from a second subband allocated to a second UE that receives the same CBG failure mask.

30. The first UE of claim 28, wherein the processor and the memory are further configured to:

receive a first retransmission grant, separated from a second retransmission grant for a second UE, from the scheduling entity, wherein the CBG failure mask comprises a first CBG failure mask for the first UE and a second CBG failure mask for the second UE, wherein the first retransmission grant signals the first UE to utilize the first CBG failure mask for CBG retransmission using a CBG based retransmission process, and wherein the second retransmission grant signals the second UE to utilize the second CBG failure mask for CBG retransmission using a CBG based retransmission process.

31. The first UE of claim 30, wherein the CBG failure mask is received in a first slot, and wherein the first retransmission grant is received in the first slot or a second slot later than the first slot.

32. The first UE of claim 28, wherein the processor and the memory are further configured to:

receive the CBG failure mask in a common search space of the first UE and a second UE that receives the same CBG failure mask.

* * * * *